Figure 1:
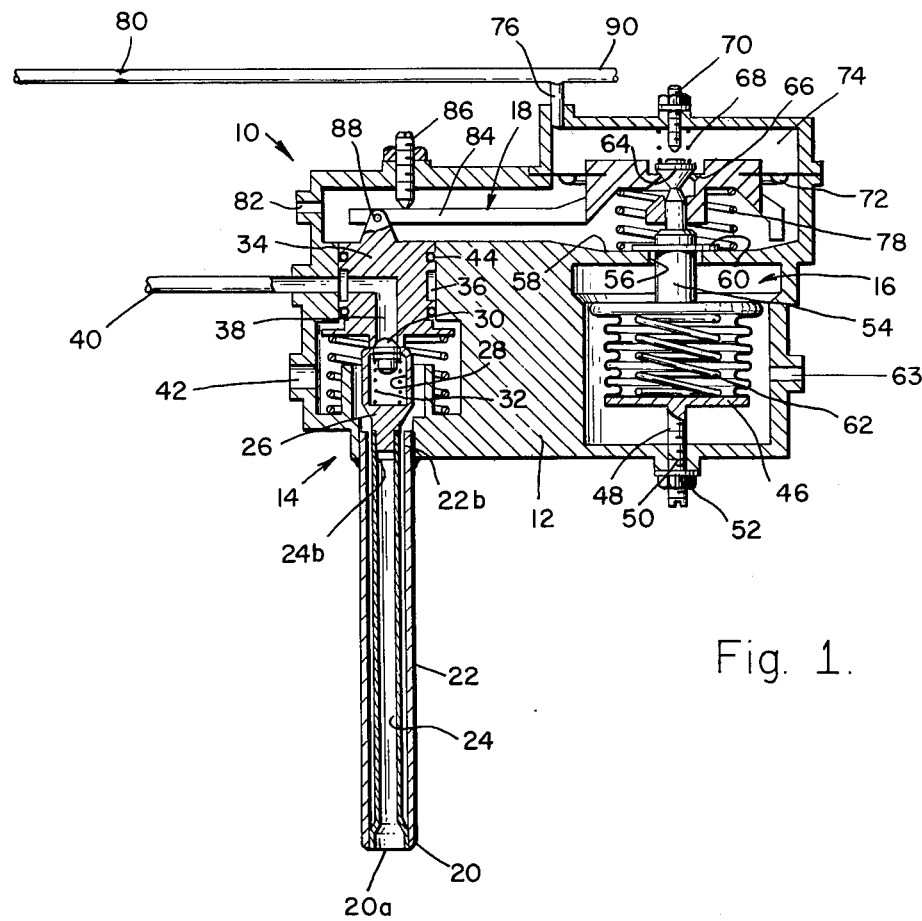

United States Patent [19]
Saylor

[11] 4,114,808
[45] Sep. 19, 1978

[54] PRESSURE BIASED PNEUMATIC THERMOSTAT

[75] Inventor: B. Franklin Saylor, Phoenix, Ariz.

[73] Assignee: The Garrett Corporation, Los Angeles, Calif.

[21] Appl. No.: 704,895

[22] Filed: Jul. 13, 1976

[51] Int. Cl.² .......................................... G05D 23/08
[52] U.S. Cl. ..................................... 236/87; 98/1.5; 165/15; 137/81; 236/92 R
[58] Field of Search .................... 236/92 R, 92 C, 85, 236/87, 102, 86; 98/1.5; 137/82, 81; 73/393; 165/15

[56] References Cited

U.S. PATENT DOCUMENTS

| | | | |
|---|---|---|---|
| 1,312,253 | 8/1919 | Johnson | 236/87 X |
| 2,155,950 | 4/1939 | Nallinger | 236/92 R |
| 2,228,315 | 1/1941 | Hutton | 236/92 R |
| 2,248,807 | 7/1941 | Carlson | 236/92 C |
| 2,295,728 | 9/1942 | Gess | 98/1.5 X |
| 2,335,778 | 11/1943 | Martin-Hurst | 236/92 C |
| 2,416,453 | 2/1947 | Mather et al. | 236/92 R |
| 2,431,801 | 12/1947 | Gibson | 236/92 R X |
| 2,601,777 | 7/1952 | Woodward | 236/92 R X |
| 2,662,757 | 12/1953 | Mock | 236/92 R X |
| 2,780,413 | 2/1957 | Jensen | 236/13 |
| 2,823,688 | 2/1958 | Stockes et al. | 137/81 X |
| 2,966,308 | 12/1960 | Jensen | 236/13 X |
| 3,122,318 | 2/1964 | Null | 236/87 |
| 3,537,644 | 11/1970 | Davison | 236/85 X |
| 3,941,310 | 3/1976 | Travaglio et al. | 236/92 R X |
| 4,005,821 | 2/1977 | Slavin et al. | 236/87 |

*Primary Examiner*—William E. Wayner
*Assistant Examiner*—William E. Tapolcai, Jr.
*Attorney, Agent, or Firm*—Joel D. Talcott; Albert J. Miller

[57] ABSTRACT

A pneumatic device is responsive to changes in temperature to vary a controlled pressure. Means are provided to vary the temperature response characteristics in accordance with changes in altitude or other variations in ambient pressure.

2 Claims, 2 Drawing Figures

U.S. Patent

Sept. 19, 1978

4,114,808

PRESSURE BIASED PNEUMATIC THERMOSTAT

This invention is related to thermal sensors and, more particularly, to a pneumatic thermal sensing device which changes a controlled pressure in response to variations in temperature such that the thermal response characteristics of the sensor are altered due to changes in the altitude of the sensor.

Pneumatic temperature sensors are well known. However, the response to temperature variations is generally constant. This is, of course, generally desirable. However, it is at times necessary to provide variations in temperature response with changes in altitude. The only variation in response to changes in altitude in prior art pneumatic sensors is inherent in their manner of operation. Such sensors operate by opening a valve at a pre-set temperature to vent a controlled pressure to ambient. The resulting variation in the controlled pressure depends upon the size of the opening and the magnitude of the ambient pressure. Accordingly, changes in ambient pressure due to altitude variations will somewhat alter the resultant pressure and thus the temperature response characteristics of the sensor. However, no significant moderation in response to variations in altitude have been previously attainable in pneumatic systems.

Electronic thermal sensors have been able to vary thermal response with changes in ambient pressure by suitable modifications in circuitry. However, these sensors are undesirable in environments, such as ducts carrying bleed air from a gas turbine engine, where excessive temperatures are to be sensed because the delicate electronic components are unable to withstand the heat.

In accordance with this invention, a pneumatic thermal sensor is provided which is capable of producing a modulating controlled pressure in response to variations in temperature and which is operable at high temperature ranges. An altitude sensing bellows assembly is coupled to the sensor to alter the response temperature which changes in altitude or, if desired, other variations in ambient pressure. If desired, the sensor may also serve to regulate a supply of air to a generally constant pressure.

Figure 2:
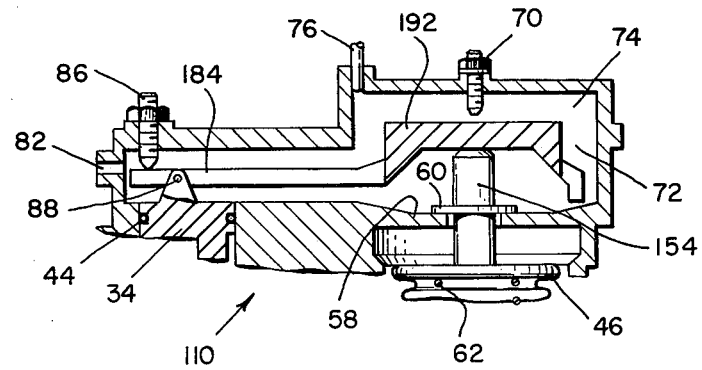

These and other advantages of the thermal sensor of this invention may be more readily understood when the following specification is read in conjunction with the appended drawings, wherein:

FIG. 1 is a cross sectional view of a thermal sensor in accordance with this invention; and FIG. 2 is a generally cross sectional view of an alternate embodiment of the thermal sensor of this invention.

Referring now to the drawings, FIG. 1 illustrates a thermal sensor 10 having a metallic body 12. Suitable openings provided in the body 12 accommodate a pneumatic thermostat assembly 14, an aneroid bellows assembly 16 and a pressure bias coupling assembly 18.

The pneumatic thermostat assembly 14 may be of any conventional variety but preferably comprises a bimetal thermal sensing element 20 comprising an outer tube 22 of material having a predetermined coefficient of thermal expansion and an inner tube 24 having lower coefficient of thermal expansion. The outer tube 22 and inner tube 24 are welded together at an extended end 20a of the sensing element.

An inner end 22b of the outer tube 22 may be threaded, brazed or otherwise suitably secured to the body 12. An inner end 24b of the inner tube 24 is secured to a thermostat ball valve 26 assembly.

The thermostat ball valve assembly 26 includes a holder 28 and a ball 30 which is driven by a spring 32. Upon suitable positioning of the holder 28, the ball 30 is driven by the spring 32 against a movable valve seat 34 which is mounted for motion in a tubular channel 36 in the body 12. The ball 30 closes the end of a passage 38 in the movable valve seat 34 which communicates with a control pressure port 40.

Under low temperature operation, the thermostat ball valve assembly 26 is urged toward the movable valve seat 34 so that the ball 30 is driven by the spring 32 against the valve seat closing the passage 38 such that a controlled pressure is maintained at a predetermined value in the control pressure port 40. Upon an increase in temperature, the action of the bimetal thermal sensing element 20 pulls the thermostat ball valve assembly away from the valve seat such that the ball 30 is withdrawn and permits air or other fluid to bleed from the control pressure port to ambient through a vent 42. This produces a drop in the pressure in the control pressure port 40. As temperature increases and the bimetal thermal sensing element further withdraws the thermostat ball valve from the valve seat, pressure in the control pressure port 40 will continue to decrease. By a suitable choice of components, the decrease in pressure may be made generally proportional to the increase in temperature.

The use of a movable valve seat 34 makes it possible to vary the thermal characteristics of the pneumatic thermostat assembly 14. Motion of the valve seat 34 longitudinally within the channel 36 will positionally vary the point at which action of the bimetal thermal sensing element 20, responsive to temperature changes, will cause removal of the ball 30 from the end of the passage 38. By moving the valve seat 34 toward the sensing element 20, greater motion of the holder 28 away from the valve seat will be necessary before the ball 30 is unseated. This means that pressure in the control pressure port will not begin to decrease until a higher temperature has been reached. Conversely, motion of the valve seat 34 away from the sensing element 20 lowers the temperature at which a drop in pressure in the control pressure port 40 begins to occur. Leakage is prevented during motion of the movable valve seat 34 by the presence of O-ring seals 44 around the junction of the passage 38 and control pressure port 40.

Altitude responsive variations in thermal characteristics of the sensor are controlled by the aneroid bellows assembly 16. This generally consists of a conventional evacuated bellows 46 having a threaded end portion 48 secured through an opening 50 in the body 12 by a calibration nut 52. The other end of the bellows has a drive post 54 which extends through an opening 56 in wall 58 of the body 12 and has a radially protruding stop flange 60 resting against the wall 58. A spring 62 in the bellows 46 is compressed to exert force against ambient pressure which is applied to the bellows 46 through a vent 63.

An extended end of the drive post 54 operatively engages a bleed off poppet valve 64 which is held against a valve seat 66 by a spring 68. An adjustable stop 70 limits motion of the poppet valve 64. The valve seat 66 is secured to an outer wall of the body 12 by a diaphragm 72 to form a chamber 74 which is pressurized through a duct 76. A spring 78 drives the valve seat 66 away from the wall 58 opposing the pressure drop across the diaphragm 72.

The duct 76 is preferably connected to a source of air or other fluid at a reasonably constant pressure such as the orifice 80 and provides sufficient pressure in the chamber 74 to generally overcome the force exerted by the spring 78. This moves the valve seat 66 toward the bellows 46 until the bleed off poppet valve 64, driven by the spring 68, rests against the extended end of the drive post 54.

When the bellows 46 is subjected to reasonably high pressure, such as when the thermal sensor 10 is at sea level, the bellows 46 is fully compressed. Should the pressure to which the bellows 46 is subjected through the vent 63 decrease, as by increase in altitude of the thermal sensor 10, to a value which permits the force of the spring 62 to overcome the pressure and, through the poppet valve 64, the force of the spring 68, the bellows 46 expands and the drive post 54 moves the poppet valve 64 out of the seat 66. This permits pressure to bleed from the chamber 74 through the valve seat 66 and to ambient through a vent 82 so that the pressure differential across the diaphragm 72 is significantly decreased. As a result, the spring 78 urges the valve seat 66 against the poppet valve 64 terminating flow and permitting pressure in the chamber 74 to increase to about its previous value. With this mode of operation, the more massive valve seat 66 functions as a follower, responding to motion of the less massive poppet valve 64. Thus, the relatively small force exerted by the spring 62 in the bellows 46 need only move the small mass of the poppet valve 64 while the greater mass of the valve seat 66 and its other connected elements, discussed subsequently herein, are moved by the greater forces exerted by the spring 78 and the pressure differential across the diaphragm 72.

Should an increase in pressure, such as that caused by a decrease in altitude, cause the bellows 46 to be compressed, the drive post 54 is withdrawn from the poppet valve 64 and permits the pressure in the chamber 74 and the force of the spring 68 to overcome the force of the spring 78 and move the valve seat 66 and poppet valve 64 back to the rest position against the drive post 54.

As can be seen in FIG. 1, the valve seat 66 is connected by a lever arm 84 through a fulcrum screw 86, which is threaded through an outer wall of the body 12, and to a pivot 88 on the movable valve seat 34 of the pneumatic thermostat assembly 14. The previously described motion of the valve seat 66 in response to changes in ambient pressure or altitude are translated through the lever arm 84 into motion of the movable valve seat 34. For example, should altitude increase such that ambient pressure decreases, the valve seat 66 is moved away from the wall 58. The lever arm, moving with respect to the fulcrum screw 86, moves the movable valve seat 34 toward the thermostat ball valve 26. This produces an increase in the temperature at which action of the bimetal thermal sensing element decreases pressure in the control pressure port 40. As altitude decreases and pressure again increases, the valve seat is moved back away from the thermostat ball valve 26 causing a corresponding decrease in the response temperature.

Accordingly, a pneumatic thermal sensor is provided which causes change in a controlled pressure in response to changes in temperature and has thermal response characteristics which may be altered by changes in ambient pressure such as those which are produced by changes in altitude of the thermal sensor.

The pressure-produced change in thermal response can be precisely controlled by use of the adjustments provided by the calibration nut 52 and adjustable stop 70. Adjustment of the calibration nut 52 establishes an upper pressure response limit, thus determining the highest pressure or lowest altitude at which the bellows will begin to expand causing a change in the thermal characteristic of the thermostat assembly 14. The position of the adjustable stop 70 limits motion of the valve seat 66 and, accordingly, the movable valve seat 34 and thus determines a ΔP or pressure difference through which a change in thermal response will be effected.

In addition to the operations heretofore described, the bleed off poppet valve 64 and valve seat 66 can also function to regulate pressure within the duct 76. Should pressure in the chamber 74 increase beyond the predetermined value for operation, the force applied thereby against the valve seat 66 will become greater than the force applied by spring 78. This will cause the valve seat 66 to separate from the poppet valve 64 and permit flow from the chamber 74 to ambient through the vent 82. Once the pressure has returned to the preset value, the force applied by the spring 78 will close the valve. Thus, the pressure in the chamber 74 and the duct 76 will be held to the preset value. If desired, additional connections such as a duct 90 may be used to provide this pressure-regulated flow to other circuit components.

Referring now to FIG. 2, an alternate embodiment 110 of thermal sensor is illustrated wherein parts identical to those of the thermal sensor 10 have retained their original numbers. This embodiment illustrates the possibility of reversing the relative positions of the fulcrum screw 86 and the pivot 88 on the movable valve seat 34 so that the change in the thermal response characteristic of the sensor responsive to variations in pressure or altitude can be reversed.

A modified lever arm 184 is also illustrated and has a solid extended end portion 192 replacing the valve seat 66 and bleed off poppet valve 64 shown in FIG. 1. In this embodiment, the extended end 192 of the lever arm 184 may be unitary with or coupled to the extended end of the drive post 154. Upon decrease in ambient pressure, the spring 62 expands the bellows 46 and causes the drive post 154 to move the end portion 192 of the lever arm 184 around the fulcrum screw 86, producing longitudinal motion of the movable valve seat 34 as previously described.

While the embodiment of FIG. 2 produces the desired end result by use of a simple structure, it will be readily understood that the embodiment of FIG. 1 requires a smaller mass to be moved by expansion of the bellows 46 and uses this action to eliminate the pressure difference across the diaphragm 72 so that the spring 78 may move the lever 84. In the embodiment of FIG. 2, this pressure difference always remains and must be properly balanced against the force of the spring 78 so that the force exerted by the spring 62 may be sufficient to move the lever 184.

I claim:

1. A sensor for varying a pneumatic signal in response to variations in temperature beyond a threshold value variable in response to changes in ambient pressure, said sensor comprising:

movable seat means having a passage communicating with a source of pressurized fluid;

ball means for engaging an end of said passage for maintaining pressure therein;

thermostat means responsive to variations in temperature for moving said ball means relative to said seat means;

aneroid bellows means responsive to variations in ambient pressure for moving said seat means relative to said ball means;

lever means having one end portion operably coupled to said movable seat means and another end portion mounted in a diaphragm to define a pressure-retaining chamber;

spring means engaging said other end portion for opposing the pressure in said chamber;

valve means in said other end portion engaging said aneroid bellows; and means in said aneroid bellows responsive to a change in pressure stimulus for moving said valve means to release pressure from said chamber.

2. A sensor as in claim 1 including:

adjustable mounting means for controlling calibration of said aneroid bellows;

adjustable stop means for limiting motion of said valve means; and adjustable fulcrum means for controlling motion limits of said movable seat means.

* * * * *